Figure 1:
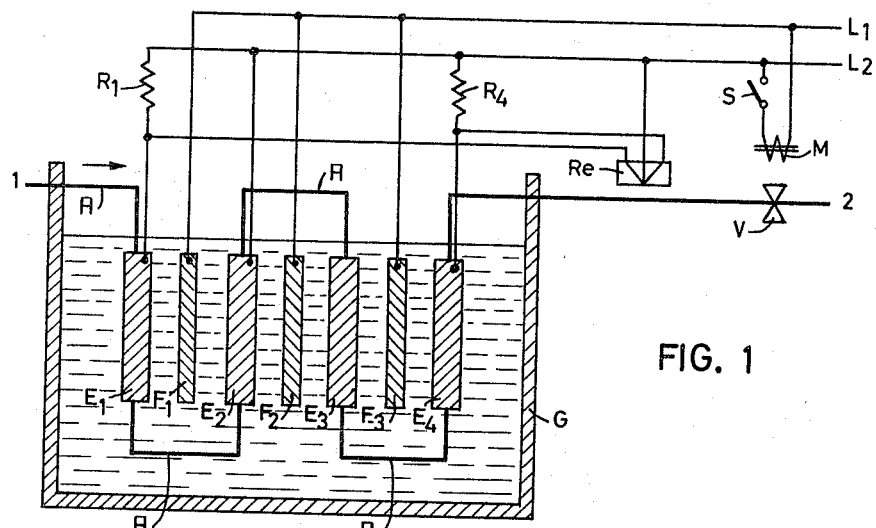

May 2, 1967    A. WINSEL    3,317,348
METHOD AND APPARATUS FOR PERIODICALLY REMOVING INERT
GAS ACCUMULATIONS FROM ELECTRO-CHEMICAL CELLS
Filed Aug. 2, 1962

United States Patent Office 3,317,348
Patented May 2, 1967

3,317,348
METHOD AND APPARATUS FOR PERIODICALLY REMOVING INERT GAS ACCUMULATIONS FROM ELECTRO-CHEMICAL CELLS
August Winsel, Braunschweig, Germany, assignor of one-half to Siemens-Schuckertwerke Aktiengesellschaft, Berlin-Siemensstadt, and one-half to Varta Aktiengesellschaft, both corporations of Germany
Filed Aug. 2, 1962, Ser. No. 214,244
Claims priority, application Germany, Aug. 5, 1961, A 38,069
10 Claims. (Cl. 136—86)

My invention relates to methods and apparatus for operating gas-diffusion electrodes in electro-chemical cells, particularly fuel cells for converting chemical energy directly into electrical energy, in which the cell electrodes are electrically parallel-connected and are supplied with reaction gases, such as the fuel and the oxidant in a fuel cell, that contain inert constituents.

It is a known, troublesome phenomenon that in such gas-diffusion electrodes the electro-chemical conversion of the particular reaction gas ceases, if, due to depletion in reaction gas, layers (cushions) of inert gas form at the electrodes. Such cushions are essentially accumulations of gas impurities which in most cases are harmless as such but through which the molecules of the reaction gas must diffuse in order to reach the three-phase electrode-electrolyte-gas boundary which constitutes the geometric locality of electric current generation. This diffusion then becomes a determining factor of the rate of electrode reaction and thus limits the load-carrying capacity of the electrode and often also its useful lifetime.

These deficiencies due to operation of gas-diffusion electrodes with inert-gas-containing reaction gases can be reduced by forcefully blowing any collected inert-gas cushion out of the electrode when observing a decline in normal cell voltage. A method of this kind has been proposed for the operation of two-cell or multi-cell fuel elements whose cells are equipped with the same type of gas-diffusion electrodes for the particular gas to be converted. The electrodes are connected in series both electrically and with respect to the reaction gas flow. Consequently the first electrode is supplied with clean gas which thereafter passes sequentially through the other electrodes. Inert-gas cushions collect in the last electrode of the series and can be blown into the environment either continuously or discontinuously. This expedient has been found particularly effective if the control of the inert-gas cushion removal is made dependent upon measuring the potential of the last electrode in the series connection.

The method described fails, however, in cases where the electrodes are electrically connected in parallel relation, this being required or of advantage for many cases of application. With a multiplicity of electrically parallel connected electrodes, each contributes its share to the total current. The partial current thus contributed is furnished from the individual electrodes at the same electric potential forced upon it by the parallel connection. With such an electrical arrangement, the above-mentioned method does not furnish a criterion as to whether an inert-gas cushion has been formed in the last electrode.

However if one supplies each individual electrode with the inert-gas containing reaction gas directly from the gas feeder line, then, with identical geometric shapes of the electrodes, one may expect that the formation of inert-gas cushions in all electrodes will be uniform and can be ascertained by observing the potential of one of the electrodes. However, with the occurrence of the slightest non-uniformity in gas supplied to the respective electrodes, the gas flow in the electrodes differs appreciably from one another. The determination or elimination control of the inert-gas cushions based upon the electrode potential then is so extremely unreliable, that each of the electrodes must be rinsed frequently and vigorously in order to secure a reliable reaction performance. This involves losing a large quantity of reaction gas and, therefore, this method also leaves much to be desired.

It is an object of my invention to devise a method and means which affords a reliable determination and control with respect to the formation of inert-gas cushions in electro-chemical cells with a multiplicity of electrically parallel gas-diffusion electrodes which are serially supplied with inert-gas-containing reaction gas.

I have discovered that with such an arrangement and connection of the gas-diffusion electrodes, the electric current contributed to the electric parallel connection by the last electrode of the gas-flow series constitutes a satisfactory reliable criterion for the formation of an inert-gas cushion. In the series arrangement of the electrodes relative to the gas flow, the gas, which becomes electro-chemically consumed by the electric load in a given electrode, must first pass through the gas spaces of all succeeding electrodes which are thus rinsed by the partially consumed gas. In the last electrode the inert-gas concentration reaches its maximum value, so that the current furnished by the last electrode is a minimum. The current further decreases in the same sense as the flow velocity of the gas. Consequently, the current in the last electrode of the gas series is an unambiguous function of the potential, the inert-gas content of the gas being supplied, and the flow rate of the gas leaving the electrode.

The sensing of the inert-gas cushions, by response to the partial current furnished by the last electrode of the gas-flow series to the parallel circuit of electrodes, also affords a steady state operation of the electrodes at a given utilization of the reaction gas. The desired operating conditions can be adjusted, controlled and regulated by means of a control device which varies the flow velocity of the gas issuing from the last electrode of the series in response to the magnitude of the last-electrode current. On the assumption that the electrode potentials of all electrodes are the same, one obtains from a comparison of the current densities at the indivdual electrodes sequentially receiving the gas flow, a criterion for the formation of a drop in concentration of reaction-gas within the series arrangement of the electrically parallel connected electrodes. Since the geometric electrode surfaces are known, the respective electrode currents directly afford a conclusion as to the current densities obtaining at the electrodes.

Based on the foregoing concepts, and in accordance with a feature of my invention, the partial current of the last electrode in the gas-supply series is measured and is compared with a reference magnitude that is characteristic of the electrical operating condition of the electrodes. As a result a comparative or differential result is obtained, and a rinsing flow of reaction gas is blown serially through the electrodes when this resultant value departs from a given range.

The just-mentioned comparison, of the last-electrode current with a reference magnitude that is characteristic of a desired operating condition, is needed because the electrode current alone does not yet suffice for unambiguously representing the condition of the electrode. For example, at a slight polarization a current of only small magnitude will flow even if a completely pure reaction gas is present in the electrode. At a great amount of polarization, however, the same current may already indicate a high degree of choking (cessation) by inert-gas accumulation. Applicable as a reference magnitude for characterizing the desired electrical operating condition are the electrode potential, the electrode polarization, or the partial current of one of the preceding electrodes in the gas-flow series, preferably the current of the first electrode in the series.

The latter embodiment is particularly advantageous because it results in especially simple supervisory and control equipment. From the departure of the partial current supplied by the last and the first electrodes respectively of the gas-flow series, one can directly determine the drop in power due to the increasing gradual choking from the first to the last electrode.

By providing a measuring or control value or signal indicative of the formation of inert-gas cushions in the above-described manner, this signal can be readily applied for continuously or intermittently ejecting the inert-gas cushions. For this purpose, according to another feature of my invention, a control device is connected in the gas supply means to be responsive to the measuring signal. The control device may consist of an electro-mechanical device acting upon a valve in the gas outlet line of the cell. The valve may be of the differential actuator type, comprising differential magnets or solenoid coils energized by voltages proportional to the last-electrode current and to the above-mentioned operating characteristic respectively, so that the valve will respond to pass a burst of gas pressure through the electrodes when the last-electrode current declines to a value indicative of excessive formation of inert gas accumulations.

Figure 2:
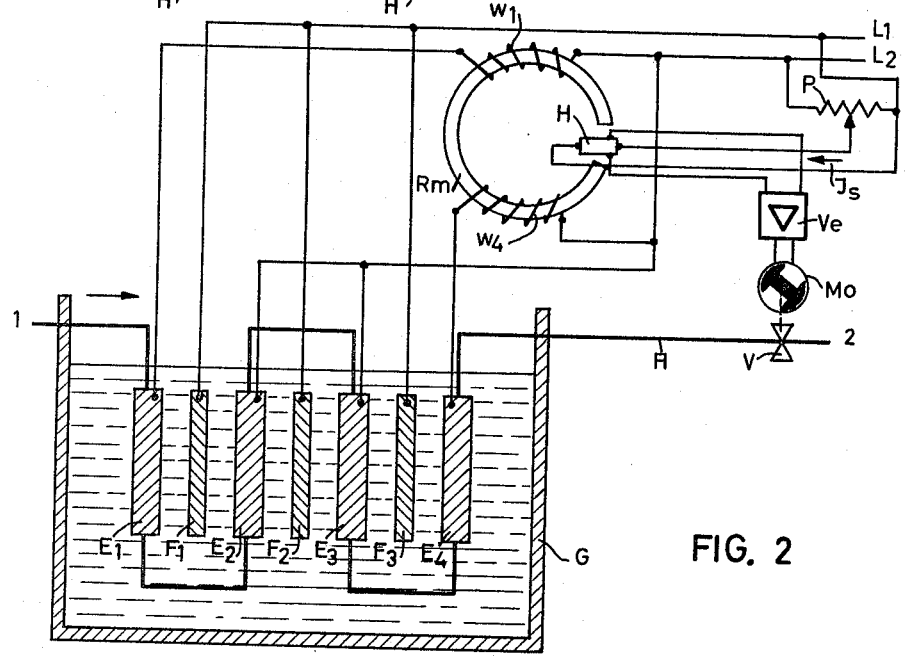
Figure 3:
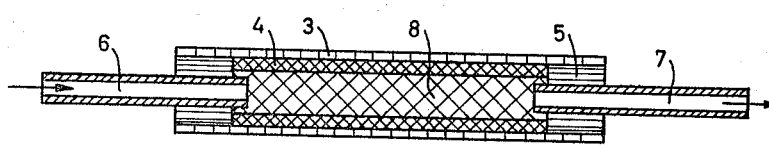

As mentioned above, it is preferable to control the discharge of gases from the last electrode of the series in dependence upon a signal magnitude that constitutes a function of the last-electrode current and of the first-electrode current or the electrode potential. The above-mentioned and further objects, advantages and features of my invention, said features being set forth with particularity in the claims annexed hereto, will be apparent from the following in conjunction with the embodiments of apparatus according to the invention illustrated by way of example on the accompanying drawings, in which:

FIGS. 1 and 2 illustrate schematically two different multi-electrode fuel cells; and FIG. 3 is an embodiment of a gas-diffusion electrode useful in the invention.

In the fuel-cell apparatus according to FIG. 1, the component circuit connections of the first and last electrode of the gas flow series are provided, according to another feature of my invention, with respective electric IR-drop resistors so that the voltage drops across these two resistors are available as a pilot and reference magnitude respectively. The illustrated equipment comprises a vessel G in which four electrically parallel connected gas-diffusion electrodes $E_1$, $E_2$, $E_3$, $E_4$ and corresponding counter electrodes $F_1$, $F_2$ and $F_3$ are mounted so as to be submerged in the electrolyte. The electrodes $E_1$ to $E_4$ have each a coarse-porous interior which is permeable to gas and each electrode has a fine-porous cover layer. Reaction gas, such as hydrogen, is supplied to the electrodes $E_1$ to $E_4$ through a gas line A. Relative to the gas flow, the electrodes $E_1$ to $E_4$ are connected in series, the pure gas entering at 1 and the consumed gas leaving the equipment at 2. In the here described example of a hydrogen-oxygen fuel cell, the electrodes $F_1$, $F_2$, $F_3$ may have a corresponding porous design and their gas spaces may also be connected in series with respect to a supply of oxygen or air. The electrolyte for such a cell may consist of potassium hydroxide (KOH). Series-connected in the circuit connections of the first and last electrode $E_1$ and $E_4$ are respective resistors $R_1$ and $R_4$. The voltage drops across these resistors are compared with each other by means of a differential relay Re. Denoted by $L_1$ and $L_2$ are output buses. Connected across these buses through a normally open contact S of the differential relay Re is the excitation winding M of a magnetic valve V in the outlet portion of the gas line A. When the electrode currents of the first and last electrode differ from each other to such a great extent as to signify the existence of a considerable inert-gas cushion in the last electrode $E_4$ of the gas series, then the differential relay Re responds and by closing its contacts S actuates the valve V. This has the result that a sudden blast of gas pressure will blow through the electrodes and remove the inert-gas cushion.

Utilizing the voltage drop caused the electrode current in the manner embodied in the apparatus of FIG. 1 results in some additional polarization. Furthermore, the sensitivity of an apparatus of the type shown in FIG. 1 can be used, without addition of amplifiers, only in the range of relatively high currents that permit using low-ohmic resistors $R_1$ and $R_4$ in order to keep the energy losses correspondingly small. An often advantageous way of providing for amplification in order to overcome the just-mentioned limitations is embodied in the modification shown in FIG. 2, in which two magnetic fields produced by the respective electrode currents are placed in comparison with each other in order to furnish a control signal for the removal of inert-gas accumulations. In FIG. 2 the same reference characters are used as in FIG. 1 for corresponding components respectively.

According to FIG. 2, the circuit connections between the bus $L_2$ and the respective electrodes $E_1$ and $E_4$ comprise mutually opposed excitation windings $W_1$ and $W_4$ on a common magnetizable core Rm, for example of annular shape. The magnetic flux in the core, constituting the difference of the fluxes induced by the windings $W_1$ and $W_4$ constitutes the measure of the inert-gas cushion formation. The core Rm may form part of any suitable electro-magnetic control device whose ultimate purpose is to control the valve V in the gas line A substantially in the same manner as described above with reference to FIG. 1. A simple way of thus responding to the flux difference caused by the windings $W_1$ and $W_4$ is by means of magnetic-field responsive resistors or Hall generators, both constituting so-called galvano-magnetic semiconductor devices. In the illustrated example, a Hall plate H of semiconductor substance, such as indium antimonide (InSb) or indium arsenide (InAs) is located in a field gap of the core Rm, the gap being shown exaggerated for the purpose of illustration but in reality not wider than the thickness of the semiconductor plate and amounting to but a few microns. The Hall plate H has a rectangular shape and is provided with two terminal electrodes around the respective narrow sides of the rectangle. By means of these electrods the Hall plate is connected to a source of a constant control current Js. The Hall plate H further carries two probe or Hall electrodes on the two long sides respectively midway between the terminal electrodes. The output voltage, appearing between the two probe electrodes is proportional to the above-mentioned flux difference and is applied to the input circuit of an amplifier Ve whose output circuit controls a servomotor Mo for valve V. In other respects the performance of the apparatus according to FIG. 2 corresponds in principle to that described above with reference to FIG. 1.

It is of advantage to adapt the sensitivity of the above-described regulating equipment to the total load of the apparatus. This can be done for example by varying the control current Js of the Hall plate in dependence upon the total current in buses $L_1$, $L_2$ or in dependence upon the current of a preceding electrode, so that the control current Js is reduced with increasing bus current. In fuel elements as shown, such a dependence can readily be achieved by connecting the control circuit of the Hall plate directly to the buses $L_1$ and $L_2$ because the bus voltage decreases with increasing bus current. Such a direct connection is shown in FIG. 2. To permit adjusting the control current Js, the connection of the Hall plate H with the buses $L_1$, $L_2$ is effected by means of a potentiometer rheostat P.

FIG. 3 shows a suitable gas-diffusion electrode. The frame of the electrode is denoted by 5, the gas-supply pipe by 6, the gas discharge pipe by 7, and the coarse-cellular gas distribution pipe by 8. The cover layer, consisting of carbonyl nickel, is denoted by 3 and the coarse-pore working layer by 4. The core of the electrode, comprising layers 4 and 8, consists of double-skeleton Raney-nickel.

Relative to further details concerning the design and materials of the electrodes, the supply of reaction gases and electrolyte and other matters relating to the construction and operation of fuel cells for the conversion of chemical inter-electrical energy, an apparatus according to my invention need not depart from what was known and available heretofore. Relative to such matters, therefore, reference may be had, if desired, to the publication by E. Justi, M. Pilkuhn, W. Scheibe and A. Winsel "Hochbelastbare Wasserstoff-Duffusions-Elektrode für Betrieb bei Umgebungstemperatur und Niederdruck," Abh. d. Math.-Nat. d. Akad, d. Wiss. u. Lit., Mainz 8, 1959, Komm.-Verlag Steiner, Weisbaden (Hydrogen-Diffusion Electrode of High Loadability for Operation at Ambient Temperature and Low Pressure, published in 1959 by Steiner at Weisbaden, Germany), as well as to U.S. Patent 2,901,523 of E. Justi and A. Winsel and to chapter 23 in the book "Direct Conversion of Heat to Electricity" edited by Joseph K. and John A. Welch and the literature mentioned in the bibliography of that chapter.

To those skilled in the art, it will be obvious upon a study of this disclosure, that apparatus according to my invention can be modified in various respects and can be adapted from case to case to the particular operating conditions of the diffusion electrodes being used, thus resulting in embodiments other than particularly illustrated and described herein, without departing from the essential features of my invention and within the scope of the claims annexed hereto.

I claim:

1. The method of periodically removing inert gas accumulations from electro-chemical energy conversion cells having electrically parallel connected gas-diffusion electrodes serially supplied with inert-gas-containing reaction gas, which comprises electrically measuring the partial current of the last electrode in the supply series as a criterion, electrically obtaining a reference magnitude characteristic of electric operating condition of the electrode, electrically comparing the partial current with said magnitude characteristic and in response to said comparison automatically blowing a rinsing flow of gas serially through the electrodes when the resultant magnitude departs from given limits.

2. The method according to claim 1, wherein the electrode potential is employed as said reference magnitude.

3. The method according to claim 1, wherein the electrode polariation is employed as said reference magnitude.

4. The method according to claim 1, wherein the partial current of a serially preceding electrode is employed as said reference magnitude.

5. In electro-chemical energy conversion apparatus having an electric load circuit and gas-diffusion electrodes electrically parallel connected to said circuit and gas supply means serially connected with said electrodes for supplying them with inert-gas-containing reaction gas, the combination of a device for periodically removing inert gas accumulations from the electrodes comprising current-responsive circuit means connected with serially last electrode relative to said gas supply means, reference circuit means connected to said load circuit for supplying a reference magnitude which is characteristic of the operation of the apparatus, a comparator means to which said two circuit means are inputwise connected, and pressure control means disposed in said gas supply means and connected with said comparator means for passing a rinsing flow of gas through said electrodes when said partial current changes to a value indicative of inert gas accumulations.

6. In electro-chemical energy conversion apparatus having an electrical load circuit and gas-diffusion electrodes electrically parallel connected to said circuit and gas supply means serially connected with said electrodes for supplying them with inert-gas-containing reaction gas, the combination of a device for periodically removing inert gas accumulations from the electrodes comprising a voltage-drop resistor series-connected between said load circuit and the one electrode that is last in the series of said gas supply means whereby said resistor furnishes a measuring voltage indicative of the partial current from said last electrode, circuit means for supplying a reference voltage indicative of a given operating condition of said apparatus, differential comparator means connected to said resistor and to said circuit means for response to the difference of said two voltages, and gas control means connected with said gas supply means and connected with said comparator means for passing a rinsing flow of gas through said electrodes when said partial current changes to a value indicative of inert gas accumulations.

7. In energy conversion apparatus according to claim 6, said comparator of said device comprising a magnetizable core having two mutually differential excitation windings connected to said resistor and said circuit means respectively whereby the resultant magnetic flux in said core is indicative of the comparative result, and means responsive to changes of said magnetic flux for actuating said pressure control means.

8. In electro-chemical energy conversion apparatus having an electric load circut and gas diffusion electrodes electrically parallel connected to said circuit and gas supply means serially connected with said electrodes for supplying them with inert-gas-containing reaction gas, the combination of a device for periodically removing inert gas accumulations from the electrodes comprising a voltage-drop resistor series-connected between said load circuit and the one electrode that is last in the series of said gas supply means whereby said resistor furnishes a measuring voltage indicative of the partial current from said last electrode, circuit means for supplying a reference voltage indicative of a given operating condition of said apparatus, differential comparator means connected to said resistor and to said circuit means for response to the difference of said two voltages, and gas control means connected with said gas supply means and connected with said comparator means for passing a rinsing flow of gas through said electrodes when said partial current changes to a value indicative of inert gas accumulations, said comparator of said device comprising a magnetizable core having two mutually differential excitation windings connected to said resistor and said circuit means respectively whereby the resultant magnetic flux in said core is indicative of the comparative result, and means responsive to changes of said magnetic flux for actuating said pressure control means, said flux responsive means comprising a semiconductor plate, said core having a gap in which said plate is located, and electric circuitry including said plate to provide a change in voltage for controlling said pressure control means due to galvanomagnetic response of said semiconductor to changes in flux.

9. In electro-chemical energy conversion apparatus having an electric load circuit and gas-diffusion electrodes electrically parallel connected to said cricuit and gas supply means serially connected with said electrodes for supplying them with inert-gas-containing reaction gas, the combination of a device for periodically removing inert gas accumulations from the electrodes comprising a voltage-drop resistor series-connected between said load circuit and the one electrode that is last in the series of said gas supply means whereby said resistor furnishes a measuring voltage indicative of the partial current from said last electrode, another voltage-drop resistor series-connected between said load circuit and another one of said electrodes for providing a reference voltage, differential comparator means having two input circuits connected to said respective resistors and being responsive to the difference of said two voltages, and gas control means connected with said gas supply means and connected with said comparator means for passing a rinsing flow of gas through said electrodes when said partial current changes to a value indicative of inert gas accumulations.

10. In electro-chemical energy conversion apparatus having an electric load circuit and gas-diffusion electrodes electrically parallel connected to said circuit and gas supply means serially connected with said electrodes for supplying them with inert-gas-containing reaction gas, the combination of a device for periodically removing inert gas accumulations from the electrodes comprising current-responsive circuit means connected with serially last electrode relative to said gas supply means, reference circuit means connected to said load circuit for supplying a reference magnitude which is characteristic of the operation of the apparatus, a comparator means to which said two circuit means are inputwise connected, and pressure control means comprising a valve in the exit portion of said gas supply means on the downstream side of the electrodes and connected with said comparator means for passing a rinsing flow of gas through said electrodes when said partial current changes to a value indicative of inert gas accumulations.

References Cited by the Examiner

UNITED STATES PATENTS

| | | | |
|---|---|---|---|
| 1,967,801 | 7/1934 | Woodbridge | 320—51 X |
| 2,947,797 | 8/1960 | Justi et al. | 136—86 |
| 2,980,749 | 4/1961 | Broers | 136—86 |

FOREIGN PATENTS 920,670  12/1954  Germany.

WINSTON A. DOUGLAS, *Primary Examiner.*

ALLEN B. CURTIS, *Examiner.*